E. POSSON.
PNEUMATIC TIRE DRIVE FOR DYNAMOS OF RAILWAY CARS.
APPLICATION FILED JAN. 17, 1918.
1,350,467.
Patented Aug. 24, 1920.
3 SHEETS—SHEET 3.
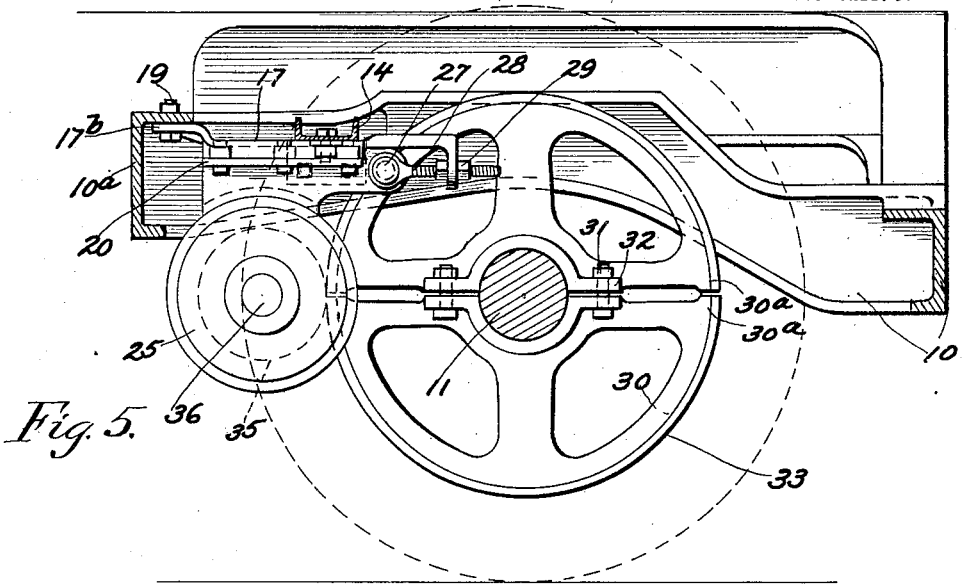
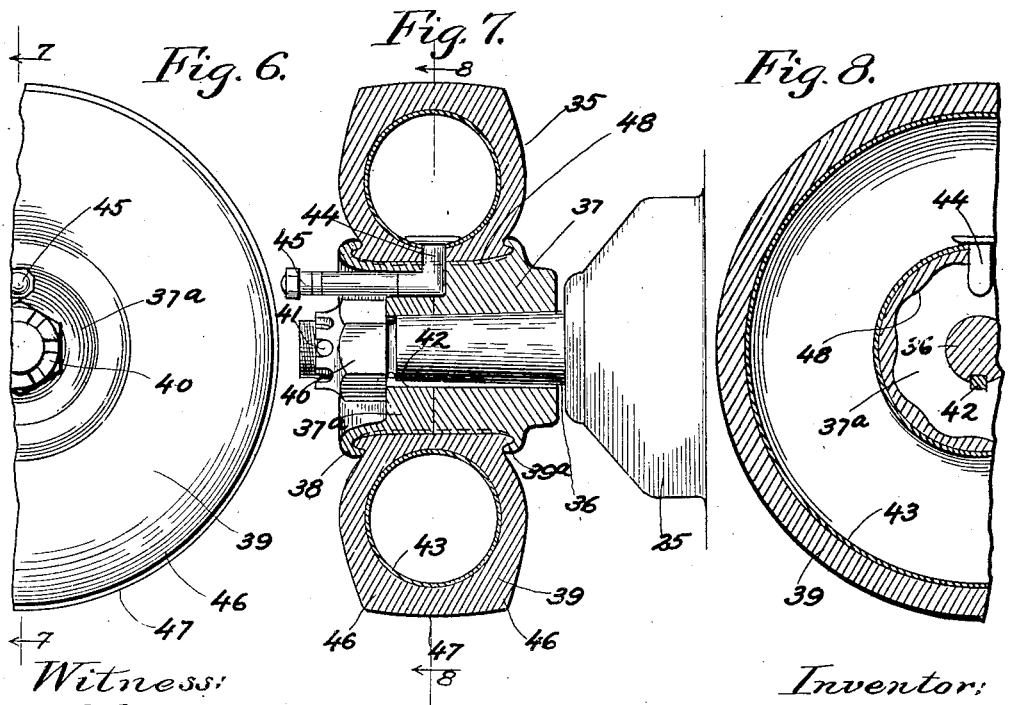
Witness:
C. C. Burnap
Inventor:
Edward Posson
By Sheridan, Sheridan & Smith, Attys

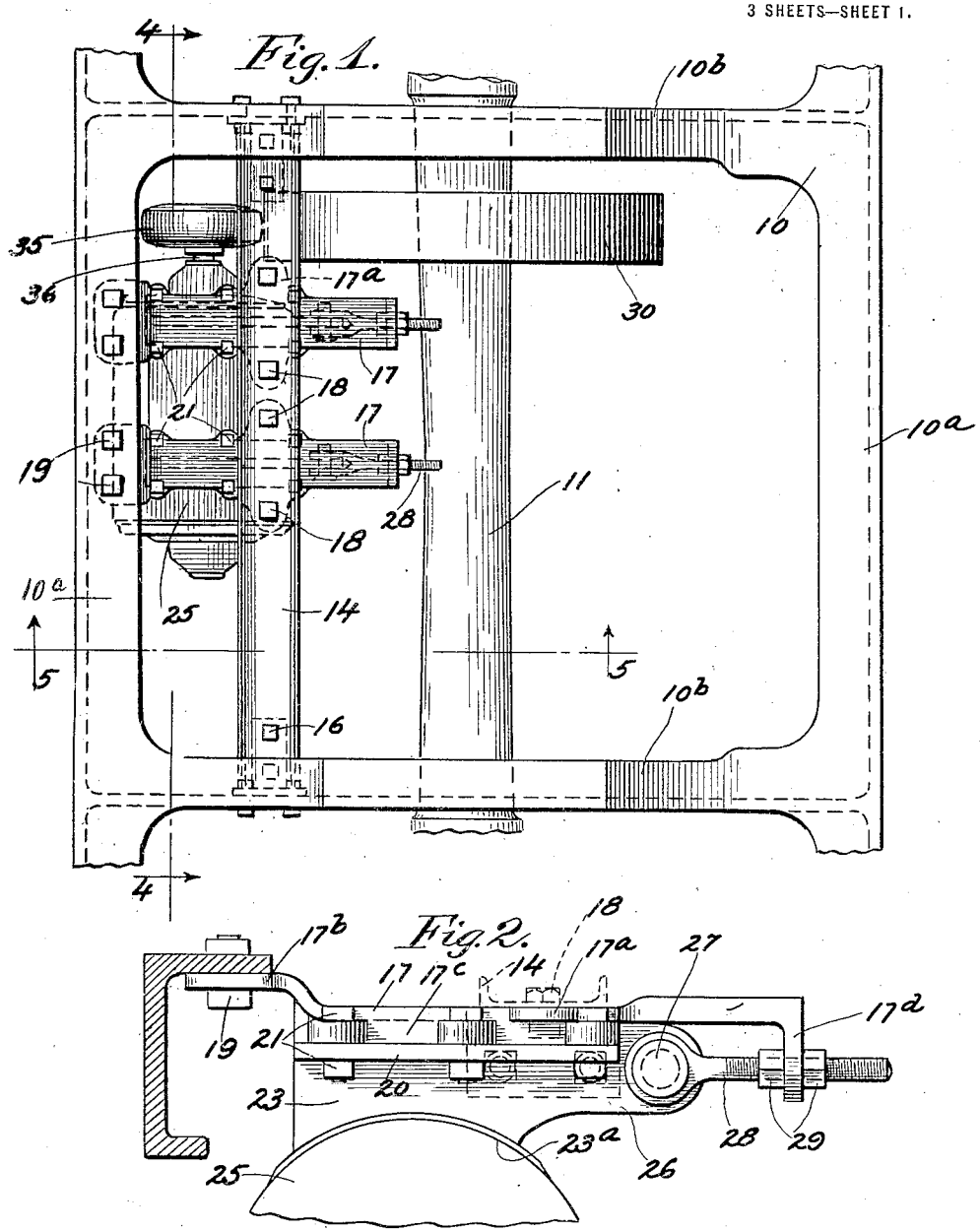

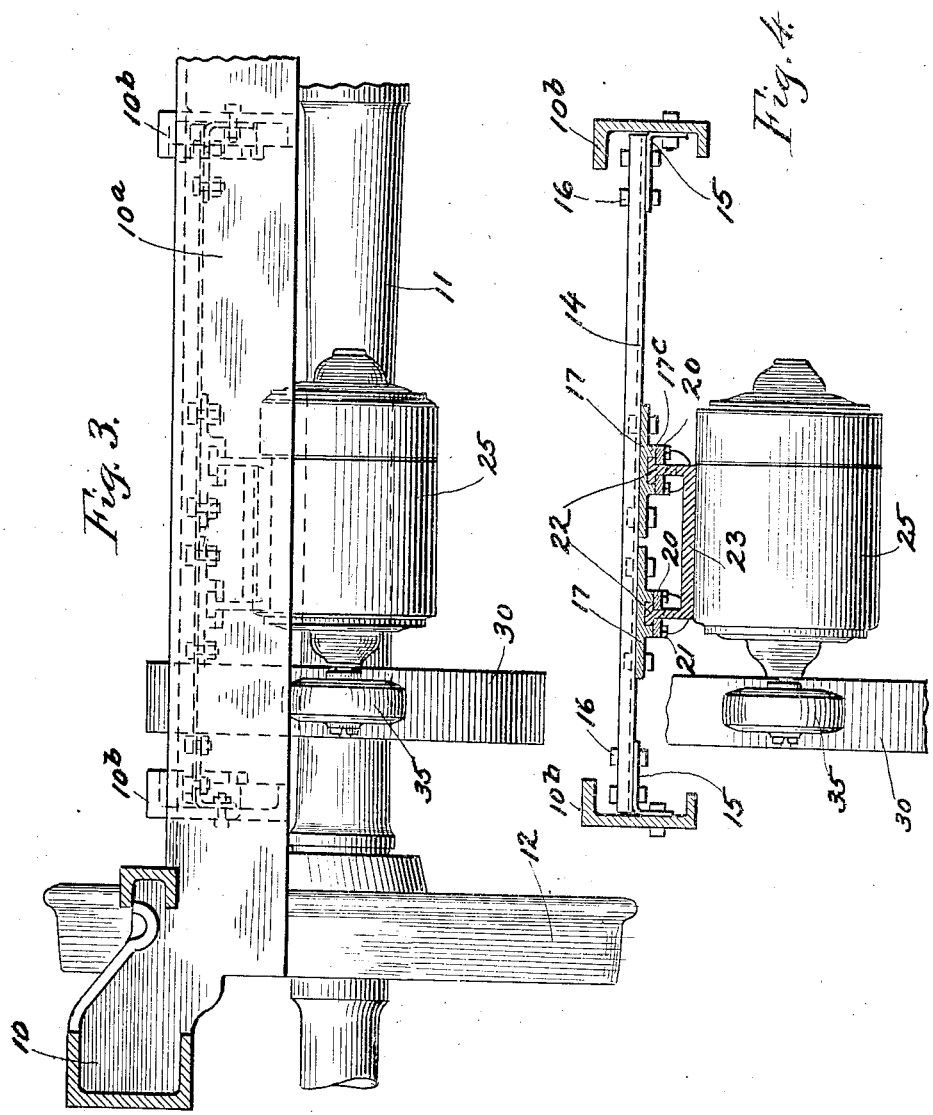

UNITED STATES PATENT OFFICE.

EDWARD POSSON, OF CHICAGO, ILLINOIS.

PNEUMATIC-TIRE DRIVE FOR DYNAMOS OF RAILWAY-CARS.

1,350,467.   Specification of Letters Patent.   Patented Aug. 24, 1920.

Application filed January 17, 1918. Serial No. 212,275.

*To all whom it may concern:*

Be it known that I, EDWARD POSSON, a citizen of the United States, residing at Chicago, in the county of Cook and State of Illinois, have invented certain new and useful Improvements in Pneumatic-Tire Drives for Dynamos of Railway-Cars, of which the following is a specification.

This invention relates to a pneumatic tire drive for dynamos, and the improvement is particularly adaptable to railway cars for driving the dynamo of the train lighting system directly from an axle of a car, thus doing away with belts, chains and other unsatisfactory driving connections which have heretofore been used. In the present invention the dynamo is mounted beneath a car or locomotive adjacent an axle, and this axle is connected to the shaft of the dynamo by two wheels having frictional driving contact with each other through the medium of a pneumatic tire. A further feature is the provision of means for adjusting the pressure of contact between the driving and driven wheels. Another feature of the invention is the provision of improved means for mounting the dynamo and for adjusting the position thereof. A further object of the invention is to provide improved means for mounting the tire on one of the wheels. Other objects relate to various features of construction and arrangement which will be pointed out more fully hereinafter.

The nature of the invention will be understood from the following specification taken in connection with the accompanying drawings in which one embodiment is illustrated.

In the drawings—

Figure 1 shows a top plan view of a car truck frame, illustrating the application of my invention thereto;

Fig. 2 shows an enlarged side elevation of the means for mounting and adjusting the position of the dynamo;

Fig. 3 shows an end elevation of the car truck with parts thereof broken away;

Fig. 4 shows a sectional view taken on the line 4—4 of Fig. 1;

Fig. 5 is a sectional view taken longitudinally of the car on the line 5—5 of Fig. 1, showing a side elevation of the car wheel and dynamo;

Fig. 6 shows an enlarged partial side elevation of the driven wheel of the dynamo;

Fig. 7 shows a sectional view taken on the line 7—7 of Fig. 6; and

Fig. 8 shows a sectional view on the line 8—8 of Fig. 7.

The invention may be applied to substantially any form of car or locomotive, but is herein illustrated in connection with a railway car having a truck frame 10 comprising transversely extending frame members 10$^a$ and longitudinally extending frame members 10$^b$. This frame is supported in the usual manner upon the car axle 11 which is carried by and rotates with the car wheels 12. These features do not in themselves form a part of the present invention, but are illustrated for the purpose of showing the application of my improved means for mounting and driving the dynamo.

A transversely extending supporting member 14, preferably of channel form is mounted between one of the end frame members 10$^a$ and the axle 11 and is connected to the side frame members 10$^b$ by means of brackets 15 and bolts 16. The supporting member 14 and the adjacent end frame member 10$^a$ form supports for the guide-plates 17 which are mounted on the underside thereof. Each guide-plate 17 is provided between its ends with laterally extending ears 17$^a$ which are connected to the member 14 by bolts 18, and at the ends thereof adjacent the frame member 10$^a$, the guide-plates are offset upwardly and terminate in flanges 17$^b$ which are secured to the frame member 10$^a$ by means of bolts 19. These guide-plates are spaced apart transversely of the car and extend parallel to each other in a direction longitudinally of the car. On their under sides, the plates 17 are provided with downwardly extending parallel lugs 17$^c$, and these lugs have secured thereto longitudinally extending plates 20, which are held in position by cap screws 21. The plates 20 overlap the inner edges of the lugs 17$^c$, so that T-shaped slots or guideways are formed between the lugs to receive the similarly shaped guides 22 which are formed on or carried by the dynamo saddle or hanger 23. The hanger 23 is provided on its underside with an arcuate surface 23$^a$ adapted to conform to the contour of the dynamo 25 to which the hanger is secured by suitable means, and the guides 22 extend upwardly from the body of the hanger, as illustrated for instance in Fig. 4. The guides 22 are extended laterally at one side of the hanger to form flanges 26, which are pivotally connected by pins 27 with threaded rods 28. These rods extend through suitable apertures in the downwardly extending flanges 17ᵈ formed at the inner ends of the guide-plates 17, and the lock nuts 29 which engage the rods on opposite sides of the flanges 17ᵈ permit the rods to be adjusted in their positions in order to slide the hanger 23 in its guideways and thereby adjust the position of the dynamo with respect to the car axle.

A drive wheel 30 is fixed on the axle 11, being formed in two parts 30ᵃ which are attached together by bolts 31 engaging the flanges 32 in order to clamp the driving wheel into fixed engagement with the axle, and the peripheral surface of this driving wheel has secured thereon a layer or coating 33 which may be formed of rubber belting, or the like, cemented or riveted to the face of the driving pulley. This wheel 33 is arranged to drive the wheel 35 which is fixed on the shaft 36 of the dynamo. The wheel 35 comprises a hub 37, the outer portion 37ᵃ of which is detachable from the body portion thereof in order to permit separation of the annular hooked flanges 38 which are adapted to clench the corresponding annular projections 39ᵃ on the pneumatic tire 39. The portions of the hub closely fit the tapered shaft 36 and are secured in position by the nut 40 and pin 41. A key 42 permits rotation of the wheel 35 with respect to the shaft. In the embodiment illustrated, the tire is shown as having an outer casing and an inner tube 43, but a single tube tire may be used with substantially equal advantage. The tire is inflated through a valve stem 44 which extends inwardly into the hub 37 and then transversely to the face of the hub where it is engaged by a cap 45. The outer casing 39 preferably has substantially the contour shown in the drawings, being provided with shoulders 46 adjacent the outer part of its peripheral surfaces with the intervening peripheral surface 47 slightly convex, as shown in Fig. 7. When the tire is inflated, it is held against rotation with respect to the hub of the wheel by the convolutions 48 which are formed in the outer peripheral surface of the hub, as illustrated in Figs. 7 and 8. The inflation of the tire, which imparts to it a substantially rigid form, causes the inner parts thereof to firmly grip these convolutions, thus holding the tire in fixed position on the hub.

In operation, the nuts 29 on the threaded rods 28 are adjusted to secure a firm pressure between the pneumatic tire 39 and the covering 33 of the drive wheel 30, and this pressure of contact will serve to flatten out the convex surface 47 of the tire in order to secure a perfect driving engagement between the two wheels throughout the entire width of the tire. After continued use, the position of the dynamo may be adjusted to regulate the pressure between the wheels and compensate for wear in the various parts of the device and for variations in the pressure within the pneumatic tire. Instead of mounting the pneumatic tire on the driven wheel of the dynamo, the pneumatic tire may be mounted on the driving wheel carried by the car axles, but the arrangement herein described is now preferred. By means of this construction, a dynamo may be very readily connected to a car axle to be driven thereby, and a firm driving engagement is maintained at all times without danger of injury or accident and without the difficulties which are dependent upon the use of belts, chains and the like. An important feature of the invention is the location of the shaft 36 of the dynamo in substantially the same horizontal plane as the axle 11, so that vertical movement of the axle with respect to the truck frame has no material effect upon the driving engagement of the wheels 30 and 35.

Although I have shown and described a single embodiment of the invention for purposes of illustration, it will be understood that it may be constructed in various different form without departing from the scope of the appended claims.

What I claim is:

1. In combination, a shaft, a wheel fixed on said shaft, a dynamo mounted adjacent said wheel, a second wheel fixed on the shaft of said dynamo, a pneumatic tire secured to one of said wheels and engaging the periphery of the other wheel, and rigid means for adjusting the dynamo in a right line toward and from said first-named wheel to vary the frictional engagement of said wheels.

2. In combination, a shaft, a wheel fixed on said shaft, a dynamo mounted adjacent said wheel, a second wheel fixed on the shaft of said dynamo, and a pneumatic tire secured to one of said wheels and engaging the periphery of the other wheel, the periphery of the wheel to which the tire is secured being provided with convolutions to prevent relative rotation of the tire and wheel.

3. The combination in a railway car, of a dynamo mounted beneath the car, a driving wheel fixed on an axle of said car, a driven wheel fixed on the shaft of said dynamo, a pneumatic tire mounted on one of said wheels and coacting with the periphery of the other wheel, and rigid means for varying the pressure of contact between said wheels.

4. The combination in a railway car, of a dynamo mounted beneath the car, a driving wheel fixed on an axle of said car, a driven wheel fixed on the shaft of said dynamo, one of said wheels comprising a pneumatic tire coacting with the periphery of the other wheel, and means for positively adjusting the position of said dynamo in a right line with respect to said axle.

5. The combination in a railway car, of a truck frame, a dynamo suspended from said frame, a driving wheel detachably secured to an axle of said car, a driven wheel carried by the shaft of said dynamo, one of said wheels comprising a pneumatic tire coacting with the periphery of the other wheel, and positively adjustable means for sliding said dynamo toward and from said axle.

6. The combination in a railway car, of a truck frame having side frame members and an end frame member, a transverse member extending between said side frame members, guide plates spaced apart and secured to said transverse member and said end frame member, said guide plates being provided on their under sides with T-shaped slots, a dynamo hanger having T-shaped projections slidably engaging said slots, means for adjusting the position of said hanger in said slots, a dynamo carried by said hanger, a driven wheel fixed on the shaft of said dynamo, and a driving wheel fixed on an axle of said car and having a driving frictional engagement with the periphery of said driven wheel.

7. The combination in a railway car, of a truck frame comprising side frame members and an end frame member, a transversely extending frame member connected to said side frame members and extending parallel to said end frame member, guide plates attached to the underside of said end frame member and said transverse frame member, a dynamo slidably mounted on said guide plates, means engaging the ends of said guide plates and connected to said dynamo for adjusting the position thereof, a car axle journaled in said truck frame beneath said side frame members and on the opposite side of said transverse frame member from said end frame member, a driving wheel fixed on said axle, a driven wheel fixed on the shaft of said dynamo, and a pneumatic tire secured to said last named wheel and coacting with the periphery of said driving wheel.

8. The combination in a railway car, of a truck comprising a car axle, a dynamo slidably mounted on said truck to move in a plane containing said axle, means for adjusting the position of said dynamo and rigidly securing it in adjusted position, a driving wheel fixed on said axle, a driven wheel fixed on the shaft of said dynamo, a pneumatic tire fixed on said driven wheel and coacting with the peripheral surface of said driving wheel, and a valve for controlling the pressure within said pneumatic tire.

In testimony whereof I have subscribed my name.

EDWARD POSSON.